United States Patent
Schoonover et al.

(10) Patent No.: US 7,207,182 B1
(45) Date of Patent: Apr. 24, 2007

(54) SWAMP COOLER COOLING SYSTEM

(76) Inventors: Dale K. Schoonover, 2104 Appaloosa Rd., Angels Camp, CA (US) 95222; Mary L. Schoonover, 2104 Appaloosa Rd., Angels Camp, CA (US) 95222

( * ) Notice: Subject to any disclaimer, the term of this patent is extended or adjusted under 35 U.S.C. 154(b) by 192 days.

(21) Appl. No.: 11/023,126

(22) Filed: Dec. 28, 2004

(51) Int. Cl.
*F28D 3/00* (2006.01)

(52) U.S. Cl. .......................... 62/171; 62/304

(58) Field of Classification Search .................. 62/91, 62/121, 171, 279, 280, 183, 188, 304, 310; 165/60; 261/29, 97, 106
See application file for complete search history.

(56) References Cited

U.S. PATENT DOCUMENTS

| | | | |
|---|---|---|---|
| 3,979,923 A * | 9/1976 | Jennings | 62/184 |
| 4,047,328 A * | 9/1977 | Kehl et al. | 47/59 R |
| 4,156,351 A * | 5/1979 | Schlom et al. | 62/121 |
| 4,312,819 A * | 1/1982 | Leyland | 261/152 |
| RE31,360 E | 8/1983 | Manno | |
| D284,505 S | 7/1986 | Bowman et al. | |
| 4,612,778 A | 9/1986 | Medrano | |
| 4,685,308 A * | 8/1987 | Welker et al. | 62/171 |
| 4,761,965 A * | 8/1988 | Viner | 62/171 |
| 5,003,789 A | 4/1991 | Gaona et al. | |
| 5,285,651 A * | 2/1994 | Marine | 62/171 |
| 5,383,337 A | 1/1995 | Baker | |
| 5,605,052 A * | 2/1997 | Middleton et al. | 62/171 |
| 5,775,121 A * | 7/1998 | Kuma et al. | 62/314 |
| 5,778,696 A | 7/1998 | Baker | |
| 5,931,017 A * | 8/1999 | Kanninen et al. | 62/309 |
| 5,966,953 A * | 10/1999 | Murr et al. | 62/171 |
| 6,253,565 B1 * | 7/2001 | Arledge | 62/305 |
| 6,318,108 B1 * | 11/2001 | Holstein et al. | 62/279 |

FOREIGN PATENT DOCUMENTS

EP 1353434 A2 * 10/2003

* cited by examiner

*Primary Examiner*—Mohammad M. Ali

(57) ABSTRACT

A swamp cooler cooling system for cooling down a swamp cooler includes a first conduit that has an inlet, a first outlet and a second outlet. The inlet is fluidly coupled to a water supply. A second conduit has a first end and a second end. The first end is fluidly coupled to the second outlet. The second end extends upwardly through a top wall of an outer housing of the swamp cooler for selectively cooling the outer housing.

8 Claims, 4 Drawing Sheets

SWAMP COOLER COOLING SYSTEM

BACKGROUND OF THE INVENTION

1. Field of the Invention

The present invention relates to precooler devices and more particularly pertains to a new precooler device for cooling down a swamp cooler outer housing to ensure that the swamp cooler remains at an efficient operating temperature.

2. Description of the Prior Art

The use of precooler devices is known in the prior art. U.S. Pat. No. 4,612,778 describes an outer shell which is positionable over an evaporative cooler and which is adapted for cooling a housing of the evaporative cooler. Another type of precooler device is U.S. Pat. No. 5,003,789 which includes misting system which cools air before the air enters an air flow inlet of an evaporative cooler. U.S. Pat. No. 5,383,337 describes a system for cooling water using a subterranean vessel for cooling water passed through the vessel before the water flows into an evaporative cooler.

While these devices fulfill their respective, particular objectives and requirements, the need remains for a system that is adapted for cooling an outer housing of an evaporative cooler, or swamp cooler, when the cooler reaches too high of a temperature. At such temperatures, the cooler does not operate with high efficiency. For that reason, a cooling system is needed that may be easily retrofitted to existing evaporative coolers.

SUMMARY OF THE INVENTION

The present invention meets the needs presented above by generally comprising a first conduit that has an inlet, a first outlet and a second outlet. The inlet is fluidly coupled to a water supply. A second conduit has a first end and a second end. The first end is fluidly coupled to the second outlet. The second end extends upwardly through a top wall of an outer housing of a swamp cooler for selectively cooling the outer housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
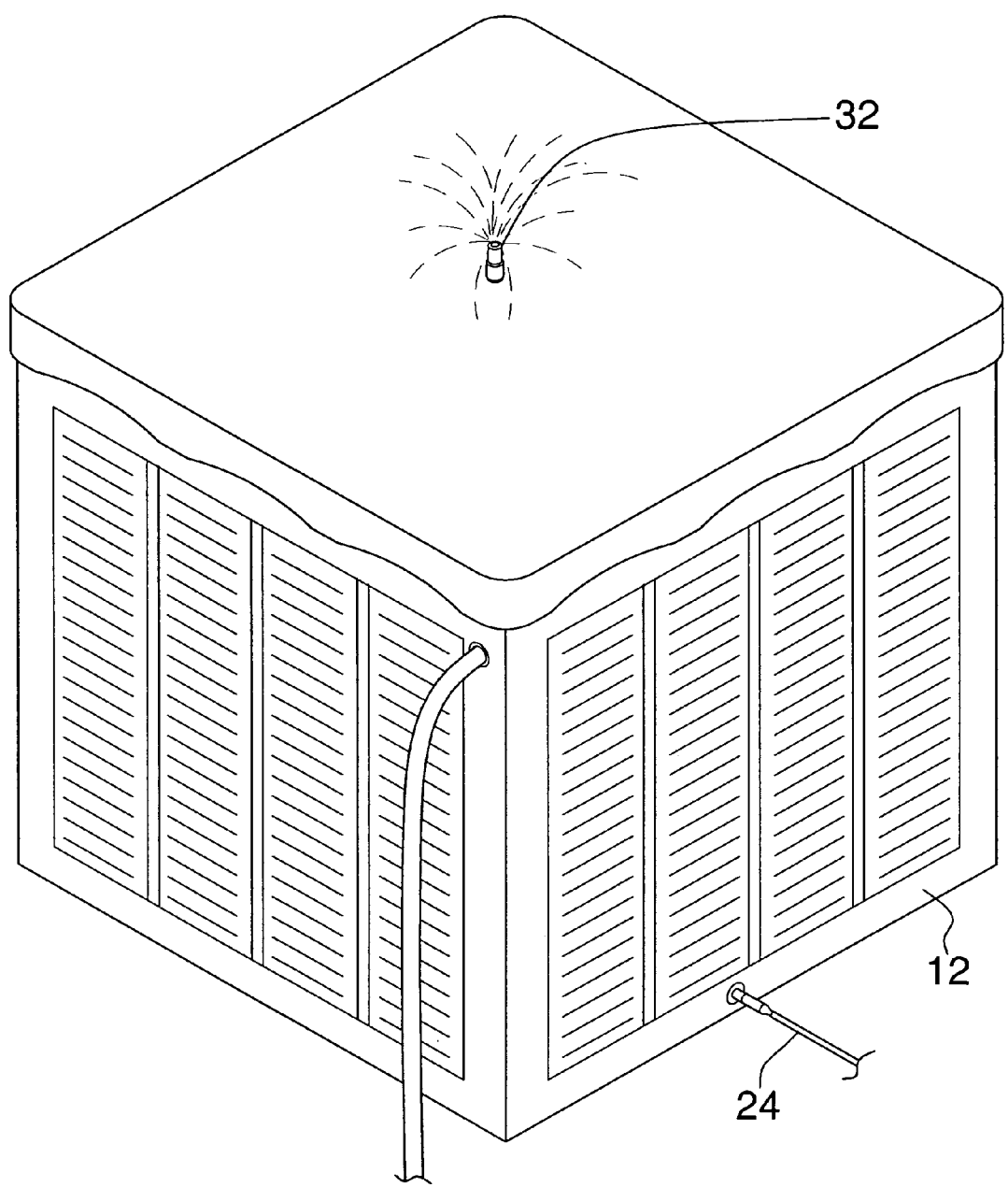
FIG. 1 is a perspective in-use view of a swamp cooler cooling system according to the present invention.
Figure 2:
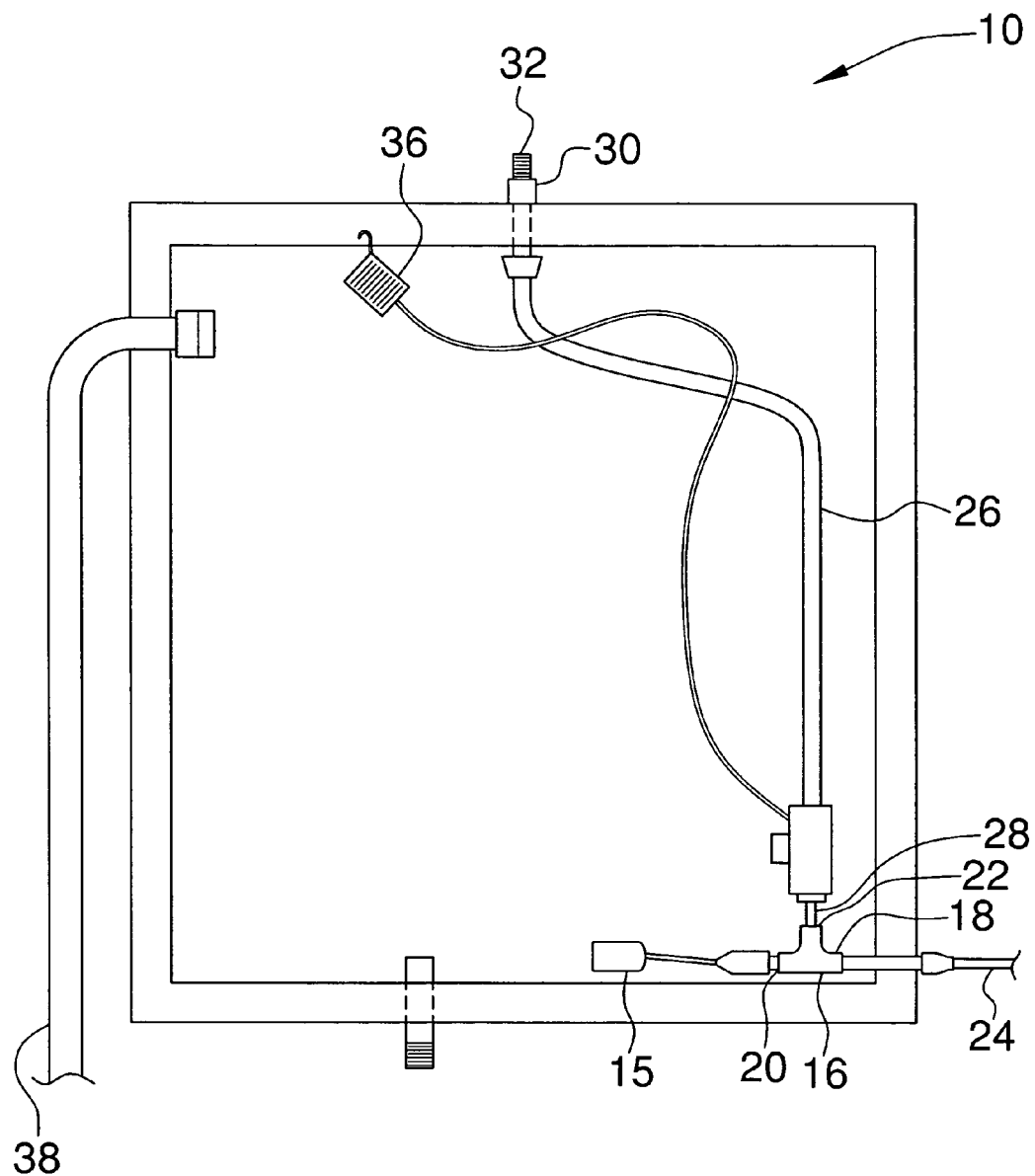
FIG. 2 is a schematic view of the present invention.
Figure 3:
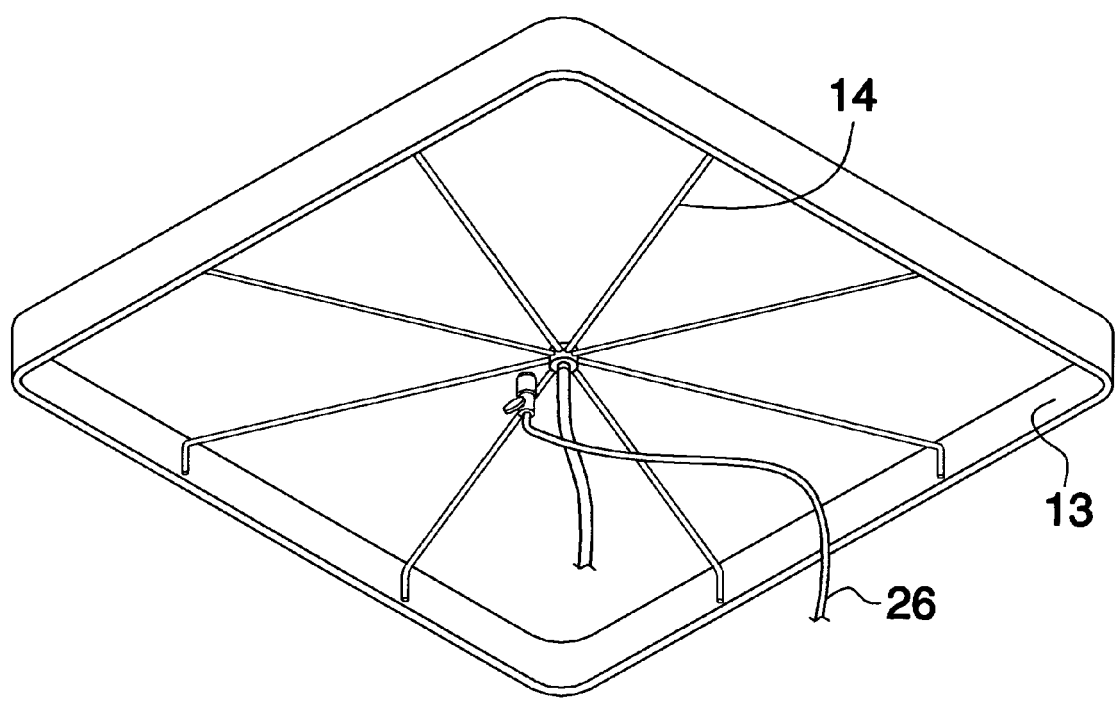
FIG. 3 is a bottom perspective view of a second conduit of the present invention.
Figure 4:
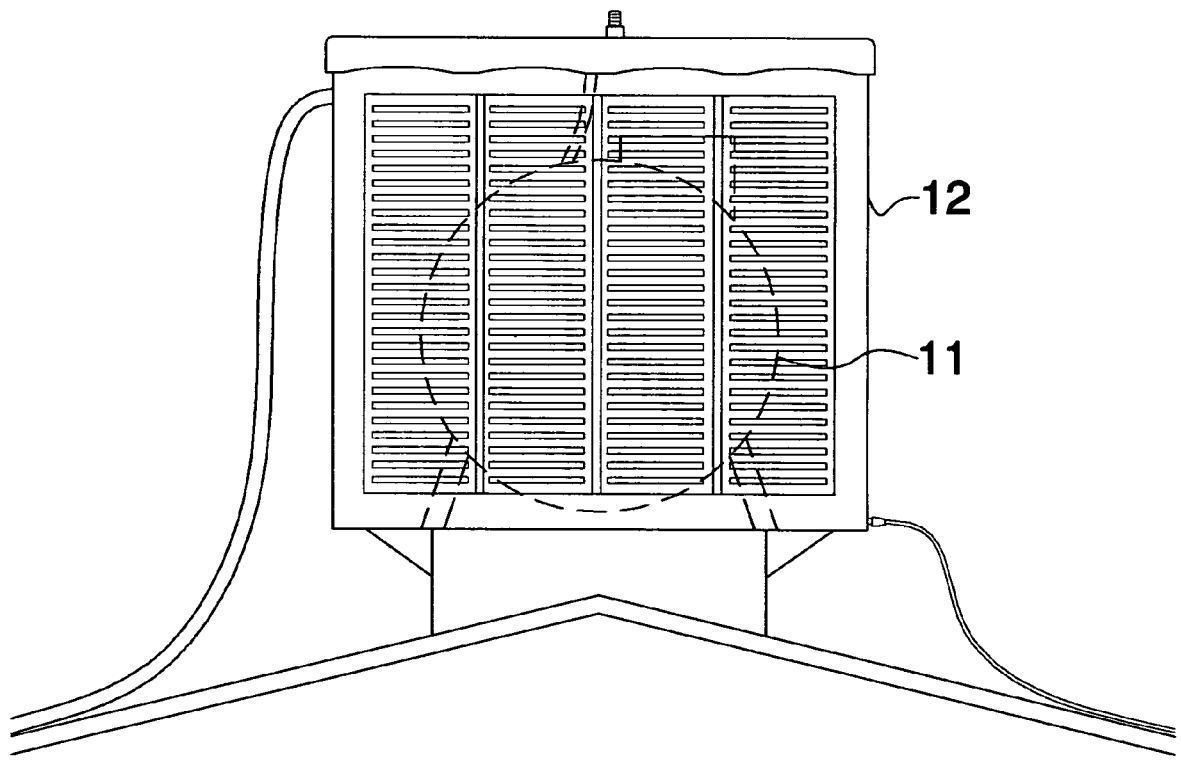
FIG. 4 is a front in-use view of the present invention.
Figure 5:
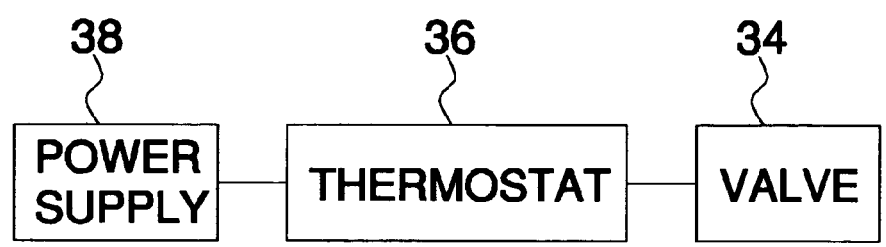
FIG. 5 is an electronic schematic view of the present invention.

With reference now to the drawings, and in particular to FIGS. 1 through 5 thereof, a new precooler device embodying the principles and concepts of the present invention and generally designated by the reference numeral 10 will be described.

As best illustrated in FIGS. 1 through 5, the swamp cooler cooling system 10 is adapted for being fluidly coupled to a swamp cooler 11, otherwise known as an evaporative cooler, and for cooling an outer housing 12 of the swamp cooler. The swamp cooler is conventional and includes an internal cooling apparatus 14. The system 10 generally comprises a first conduit 16 that has an inlet 18, a first outlet 20 and a second outlet 22. The inlet 18 is fluidly coupled to a water supply 24 of the swamp cooler. The first conduit 16 is positioned within the outer housing and the first outlet 20 is fluidly coupled to the swamp cooler 11, and more particularly a float valve 15 of the swamp cooler.

A second conduit 26 has a first end 28 and a second end 30. The first end 28 is fluidly coupled to the second outlet 22. The second end 30 extends upwardly through a top wall 13 of the outer housing 12. A nozzle 32 is fluidly coupled to the second end 30 of the second conduit 26 so that a sprinkler affect is created when water flows through the second conduit 26 and outwardly of the nozzle 32.

A valve 34 is fluidly coupled to the second conduit 24 and is adapted for selectively opening or closing the second conduit 24. The valve 34 preferably includes a solenoid type valve. A thermostat 36 is operationally coupled to the valve 34 for opening the valve 34 when a selected upper temperature limit within the outer housing 12 is attained. The temperature limit is preferably equal to about 90 degrees Fahrenheit, since, at that temperature, the swamp cooler 11 does not operate efficiently. The thermostat 36 is mounted within the outer housing 12 and positioned adjacent to the top wall 13 of the outer housing 12. The thermostat 36 is electrically coupled to a power supply 38 of the swamp cooler 11.

In use, the valve 34 is opened so that water flows across an upper surface of the outer housing 12 when an interior of the outer housing 12 reaches a temperature above 90 degrees Fahrenheit. This cools the outer housing 12 and consequently cools the interior of the outer housing 12. The cooling of the outer housing 12 ensures that the swamp cooler 11 operates more efficiently.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A cooling system adapted for fluidly coupling to a swamp cooler and cooling an outer housing of the swamp cooler, said system including:

a first conduit having an inlet, a first outlet and a second outlet, said inlet being fluidly coupled to a water supply;

a second conduit having a first end and a second end, said first end being fluidly coupled to said second outlet, said second end extending upwardly through a top wall of the outer housing;

a valve being fluidly coupled to said second conduit and being adapted for selectively opening or closing said second conduit; and a thermostat being operationally coupled to said valve for opening said valve when a selected upper temperature limit within the outer housing is attained, said temperature limit being equal to about 90 degrees Fahrenheit.

2. The cooling system according to claim 1, wherein said thermostat is mounted within the outer housing and positioned adjacent to the top wall of the outer housing.

3. The cooling system according to claim 1, wherein said thermostat is mounted within the outer housing and positioned adjacent to the top wall of the outer housing.

4. The cooling system according to claim 3, further including a nozzle being fluidly coupled to said second end of said second conduit.

5. The cooling system according to claim 1, further including a nozzle being fluidly coupled to said second end of said second conduit.

6. A cooling system adapted for fluidly coupling to a swamp cooler and cooling an outer housing of the swamp cooler, said system including:

a first conduit having an inlet, a first outlet and a second outlet, said inlet being fluidly coupled to a water supply, said first conduit being positioned within the outer housing, said first outlet being fluidly coupled to the swamp cooler;

a second conduit having a first end and a second end, said first end being fluidly coupled to said second outlet, said second end extending upwardly through a top wall of the outer housing:

a valve being fluidly coupled to said second conduit and being adapted for selectively opening or closing said second conduit;

a thermostat being operationally coupled to said valve for opening said valve when a selected upper temperature limit within the outer housing is attained, said temperature limit being equal to about 90 degrees Fahrenheit, said thermostat being mounted within the outer housing and positioned adjacent to the top wall of the outer housing; and a nozzle being fluidly coupled to said second end of said second conduit.

7. A cooling system adapted for fluidly coupling to a swamp cooler and cooling an outer housing of the swamp cooler, said system including:

a first conduit having an inlet, a first outlet and a second outlet, said inlet being fluidly coupled to a water supply; and a second conduit having a first end and a second end, said first end being fluidly coupled to said second outlet, said second end extending upwardly through a top wall of the outer housing:

a valve being fluidly coupled to said second conduit and being adapted for selectively opening or closing said second conduit;

a thermostat being operationally coupled to said valve for opening said valve when a selected upper temperature limit within the outer housing is attained, said thermostat being mounted within the outer housing and positioned adjacent to the top wall of the outer housing.

8. The cooling system according to claim 7, further including a nozzle being fluidly coupled to said second end of said second conduit.

* * * * *